INVENTOR
RICHARD H. WEICHSEL

United States Patent Office 3,467,454
Patented Sept. 16, 1969

3,467,454
AIR SEALS
Richard H. Weichsel, Hudson, Ohio, assignor to Apex
Bearings Company, a corporation of Ohio
Filed June 19, 1967, Ser. No. 647,105
Int. Cl. F16c 33/76; F16j 15/40
U.S. Cl. 308—187.1                    3 Claims

ABSTRACT OF THE DISCLOSURE

An air seal consisting of an outer housing which may be in the shape of a disk and having a grooved inner periphery which groove is arranged centrally of the disk midway between its outer edges to form an annular channel. An air duct leads from the outer periphery of the disk to the channel. The air seal also consists of a porous collar arranged over the channel through which collar a shaft extends. The collar preferably has such porosity that it will maintain a uniform hydrostatic pressure which because of the self-regulating characteristics of the material of which it is composed prevents air spill during the deflection of the shaft under load. The clearance between the collar and the shaft is sufficient to assure that the shaft under the maximum surface deflection will not come in contact with the porous metal collar and the maximum clearance is arranged at a sufficient distance from the shaft to afford an outward pouring of air to insure that there will be no increase of contaminating particles of a solid, liquid, or gaseous nature into the bearing for supporting the shaft during the rotation thereof. The bearing for supporting the shaft is preferably of the rolling element type and has its outer race secured to or fitted into a channel in a machine housing and its inner race secured to the shaft. The air seal is arranged in close proximity to the bearing with its porous collar surrounding the shaft and the outer housing thereof secured to the machine housing by suitable fastening means, such as bolts or screws.

---

The present invention relates to seals and more particularly to an air seal for bearings.

In bearings and particularly bearings of the rotating element type, such as ball, needle, or roller bearings, considerable difficulty is encountered because contaminating particles which may be of a solid, liquid, or gaseous nature, enter the bearing during rotation of the shaft supported by the bearings. Such contaminating particles usually cause the bearings to heat up and to fail or to at least partially lose their efficiency. In an attempt to overcome this deficiency, manufacturers of rotatable element bearings have provided seals of the single or double lip type on one or both sides of the bearings. Such bearings, however, are not entirely satisfactory and frequent failures occur. In accordance with the present invention, I have provided a seal which may be utilized with bearings of any desired type but which is particularly useful in association with rolling element bearings.

It is therefore an object of my invention to provide an air seal by means of which air may be blown around a rotary member, such as a shaft, to provide an air seal which prevents or minimizes the entrance of contaminating particles into bearings in which the shaft is rotatable.

Figure 1:
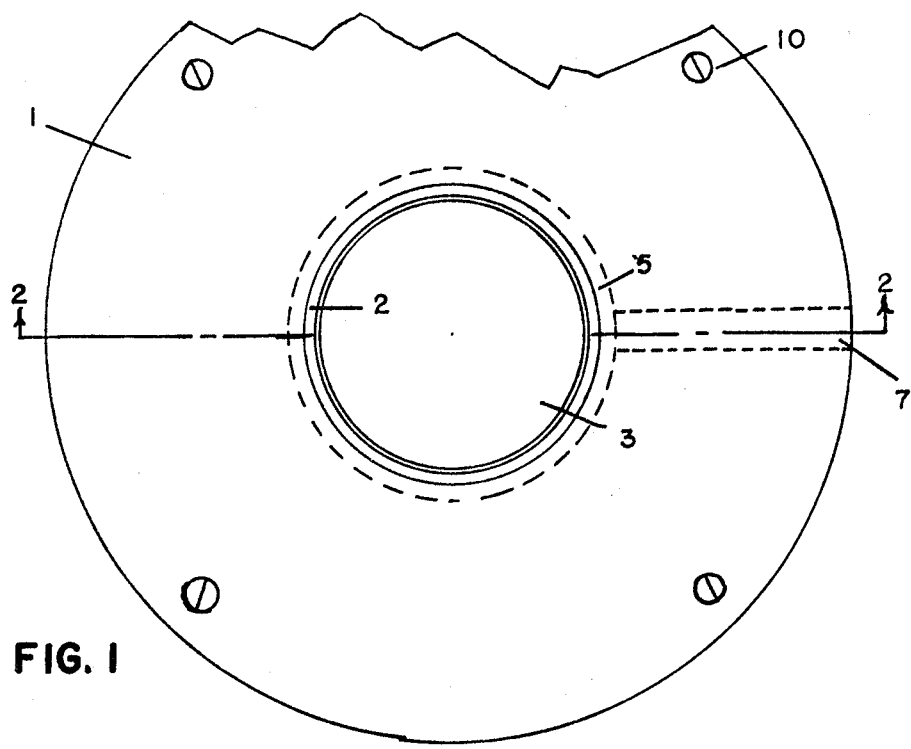
Figure 2:
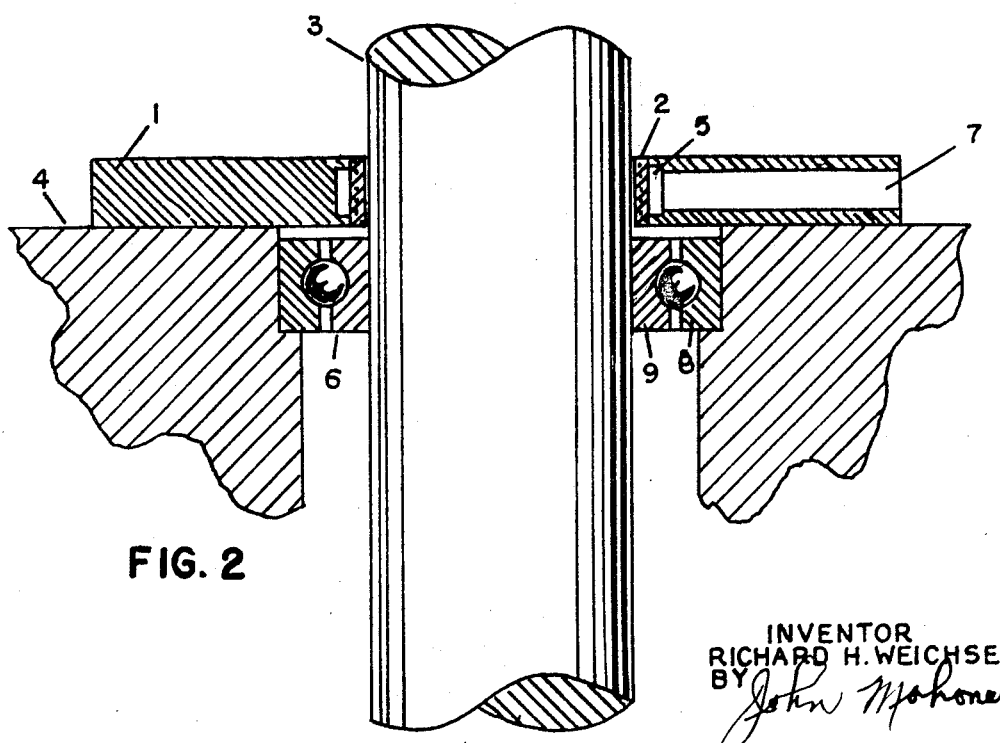

My invention will be better understood by reference to the accompanying drawings in which:

FIG. 1 is an elevational view of my improved air seal with parts shown broken away; and FIG. 2 is a cross sectional view of the seal showing it secured to a machine body in close proximity to a set of ball bearings which surround and the inner race of which supported by a shaft.

As illustrated in the drawings, my improved air seal includes the outer housing 1 and a porous collar 2 through which a shaft 3 extends and while I do not desire to be limited to the particular shape of the outer housing, it is preferably composed of a round disc of such size that it may be bolted to the end of a pillow block or as shown in the drawing to the face of a machine body 4. The housing may be formed of any suitable machinable metal, such as bronze, steel, or aluminum, and its inner periphery is grooved to form an air passage whicch may be in the form of a channel 5 and extending over the channel 5 is the porous collar 2.

The collar 2 may be formed of any suitable material which affords sufficient feed therethrough to provide a substantially uniform air seal between the collar 2 and shaft 3. It may be and preferably is composed of a commercially available material, such as "Oilite" which consists of a body composed of small copper spheres of approximately 100 mesh and of substantially uniform size which are interspersed with sintered tin particles of approximately 200 mesh. In preparing the collar 2, the copper and tin particles, both of which are in a substantially spherical shape and of approximately of the size specified are first pressed into a unitary structure and sufficient heat is applied to sinter the compact. A temperature of approximately 1535° Fahrenheit may be used The copper therefore retains its shape and is encapsulated by the molten tin to provide myriads of venturi-shaped pores through which air passing through the porous collar meets its maximum resistance as is evidenced by a substantial pressure drop. After the air is passed outwardly through the venturi-shaped pores, it expands to form a thin nonturbulent film which lies in close proximity to the inside diameter of the collar. Due to the fact that the porosity of the material of which the collar is formed maintains a uniform hydrostatic pressure, the absence of air spill in my improved air seal is possible because of the self-regulating characteristics of the material of which the collar is composed.

In the collar 2, the small copper spheres preferably constitutes the major proportion of the collar and while I do not desire to be limited to any particular proportions, the copper spheres may be present in amounts ranging from approximately 60% to 90% and the tin in proportions ranging from approximately 10% to 40%. For example, the collar may be composed of approximately 90% copper spheres and 10% sintered tin.

In preparing my improved air seal, a collar formed of the air permeable material may be selected which has the proper inside diameter to receive in spaced relation the shaft 3. There should be a minimum diametrical clearance between the collar and shaft to give the seal enough range to assure that the shaft under maximum surface deflection shall not come in contact with the porous collar whereas the maximum clearance should afford a sufficient outpouring of air to insure that there shall be no increase of contaminating particles of a solid, liquid, or gaseous medium passing into the bearing during the operation of the seal. Although I do not desire to be limited to any exact dimension, the diametrical clearance between the collar 2 and the shaft 3 should range between approximately .004 and .015 of an inch. It will of course be understood that the air merely acts as a barrier to prevent the entrance of outside air into the bearing 6 which is arranged in close proximity thereto and in this connection it may be stated that the porous collar prevents the common air spill occurring during deflection of the shaft under operating loads as in conventional air seal styles.

The outer housing 1 is provided with an air inlet duct means 7 and the outer edges of the inner channel 5 which are substantially equally spaced from the outer walls of the housing may have a depth which is approximately one-half of the thickness of the porous collar.

In preparing my improved air seal, the outside diameter of the collar and the inside diameter of the housing should be substantially equal although the inside diameter of the opening in the housing and the outside diameter of the collar may each vary .00025 of an inch from its nominal diameter. In such case, the collar after being formed may be cooled to a temperature of approximately 0° Fahrenheit and the housing may be heated to a temperature of approximately 250° Fahrenheit. The housing may then be slipped over the porous collar and the assembly allowed to attain room temperature. The composite seal may then be mounted upon a mandrel and the outer housing turned to provide the desired outside diameter.

In utilizing my improved air seal, its collar may be applied around a shaft in proximity to the bearing 6 which is arranged between the shaft and the machine housing to support the shaft. As shown, the bearing 6 is preferably of the roller type with its outer race 8 secured to the housing and its inner race secured to the shaft in any desired manner. As shown in the drawings, the outer race 8 is arranged in a recess in the housing and the inner race 9 is secured by suitable means, such as welding, to the shaft 3.

The passage of air from conduit means 7 through the annular channel 5 and the porous collar 4 usually affords sufficient air passing in contact with the shaft 3 to provide an air seal for the bearing 6. The air surrounding bearing 6 is therefore substantially free from contaminating particles from an extraneous source.

My improved air seal may be secured to the machine housing in close proximity to the bearing in any suitable manner. As shown, the housing is provided with a plurality of apertures through which fastening means, such as bolts or screws 10, may be inserted which may be threaded into tapped openings in the machine housing or body. If desired, it will of course be understood that an air seal may be arranged on each side of the bearing.

As shown in the drawings, the outer housing of my improved air seal is in the form of a disk although I do not desire to be limited in this respect. If a larger amount of air is desired, the housing may be made thicker in which case a longer porous collar or sleeve is provided, or the proportions of the copper and tin in the collar may be varied to vary its porosity, it being understood that a collar of greater porosity is provided when the proportion of tin is low as stated in the specific examples mentioned than when a greater proportion of tin is present.

What is claimed is:

1. An air seal including a rigid stationary cylindrical housing having spaced annular side walls, a collar composed of a porous material capable of maintaining its shape under air pressure arranged over and being secured to the free end of the side walls and forming with said housing an annular channel, a shaft extending through said collar, duct means extending into the housing of said seal through which air may be passed into said channel and through said collar to form an air barrier in the space between said collar and said shaft and around the shaft in proximity to the seal, means rigidly for including a support supporting said housnig and porous collar and a roller bearing in the support for supporting said shaft and said collar at a sufficient distance from said shaft so that the shaft under maximum deflection will not come in contact with any part of said porous collar, whereby to prevent contaminated air from entering the bearing.

2. An air seal as defined in claim 1 in which the support for said air seal is a machine housing.

3. The combination of a machine housing, a movable shaft, a roller bearing having portions which are penetrable by air flowing in proximity to said shaft, a seal surrounding said shaft in close proximity to said bearing including a housing having side walls and a porous collar secured to the free ends of said side walls and forming with the seal housing an annular channel, said porous collar being formed of a stationary rigid material which is capable of maintaining its shape under gas pressure, means connected to said machine housing for rigidly supporting said collar, and said roller bearing maintaining the porous collar of said seal in closely spaced relation to said shaft but at a sufficient distance therefrom so that the shaft under its maximum deflection will not come in contact with any part of said collar, duct means extending into said housing through which a gas may be introduced into said channel and passed through said porous collar to form a gaseous barrier between the porous collar and said shaft and around the shaft in proximity to the bearing to prevent contaminated air from entering said bearing.

References Cited
UNITED STATES PATENTS 1,957,054    5/1934    Waldorf _____ 308—187.1
3,001,806    9/1961    Macks.

MARTIN P. SCHWADRON, Primary Examiner

FRANK SUSKO, Assistant Examiner